Oct. 6, 1953  K. G. ZUMMACH  2,654,634
AUTOMOBILE BODY FRONT END STRUCTURE
Filed Dec. 8, 1950  6 Sheets-Sheet 4
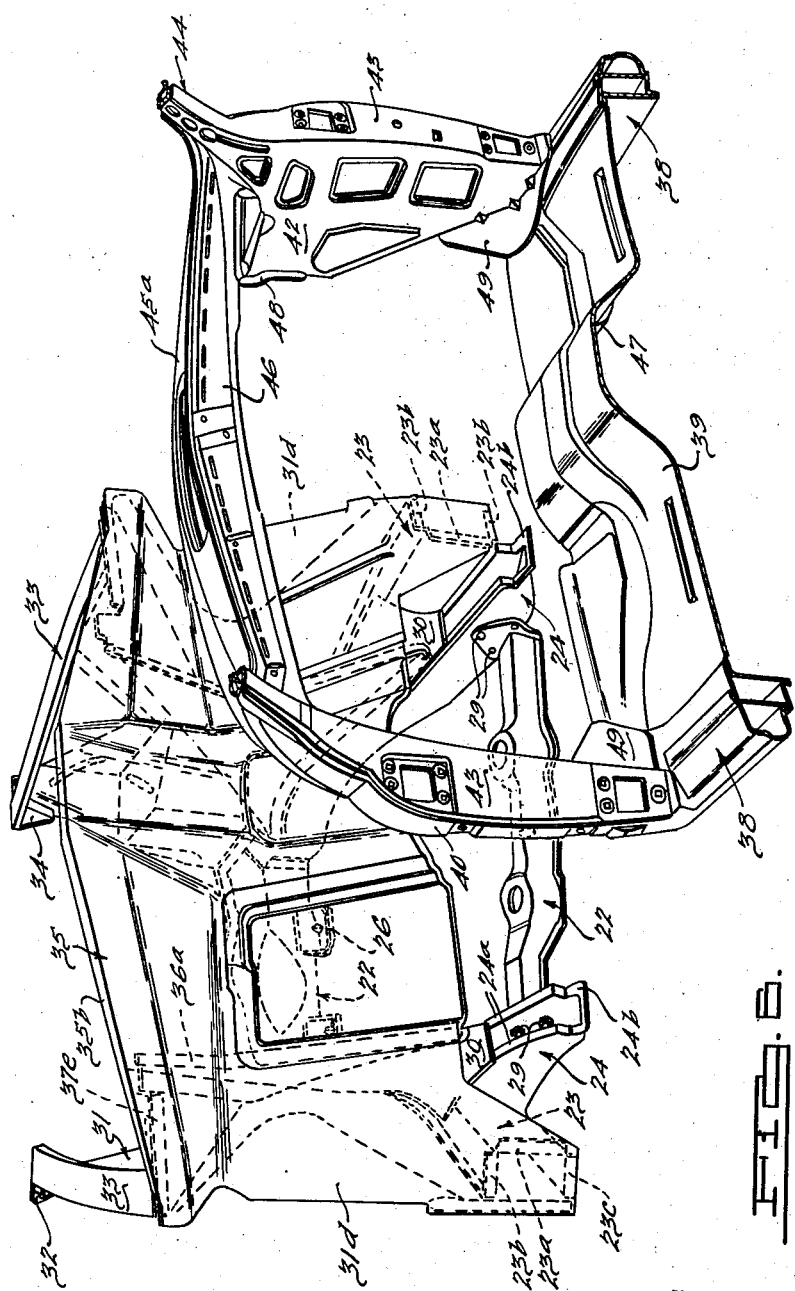
INVENTOR.
Karl G. Zummach.
BY
Elmer Jamison Gray
ATTORNEY.

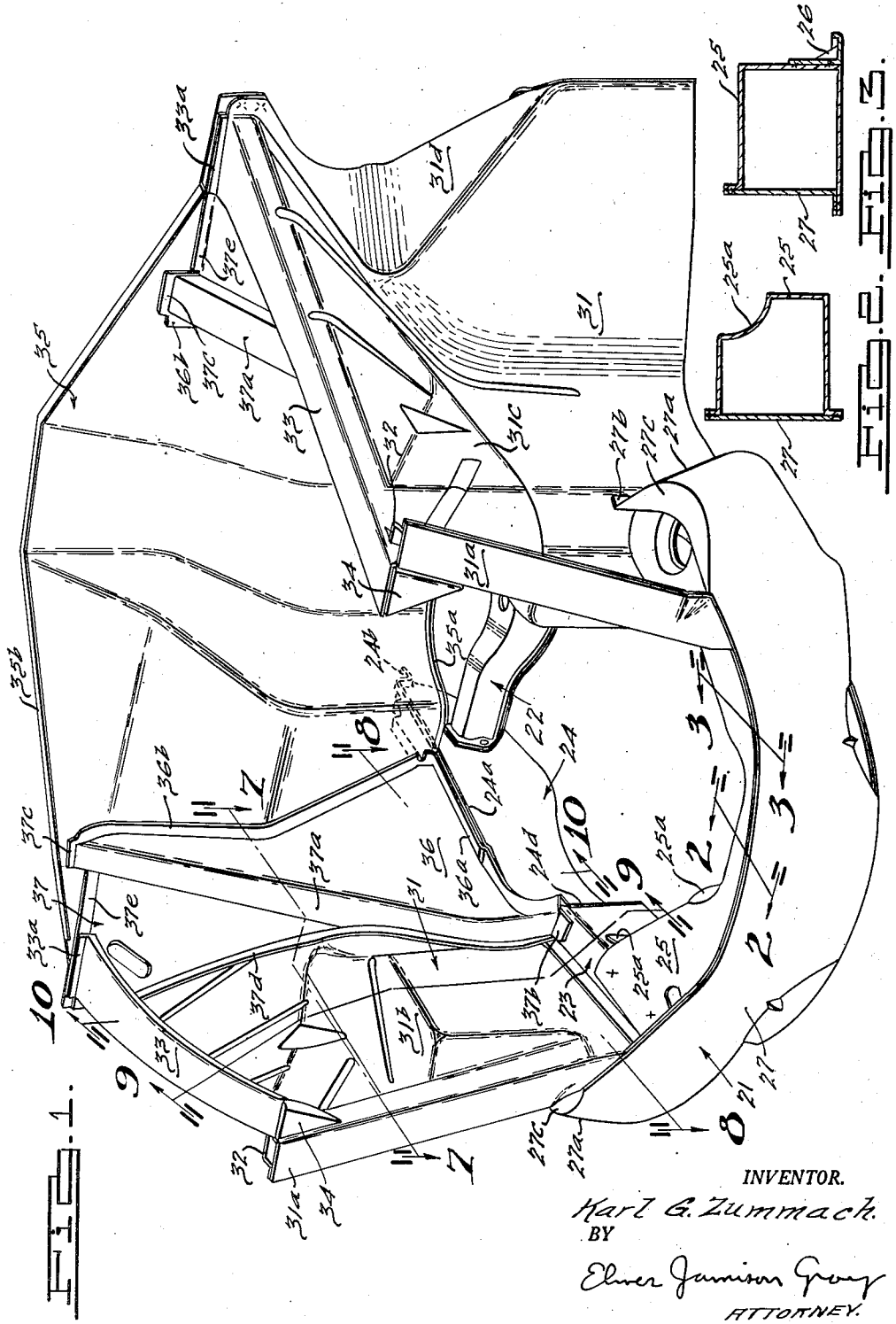

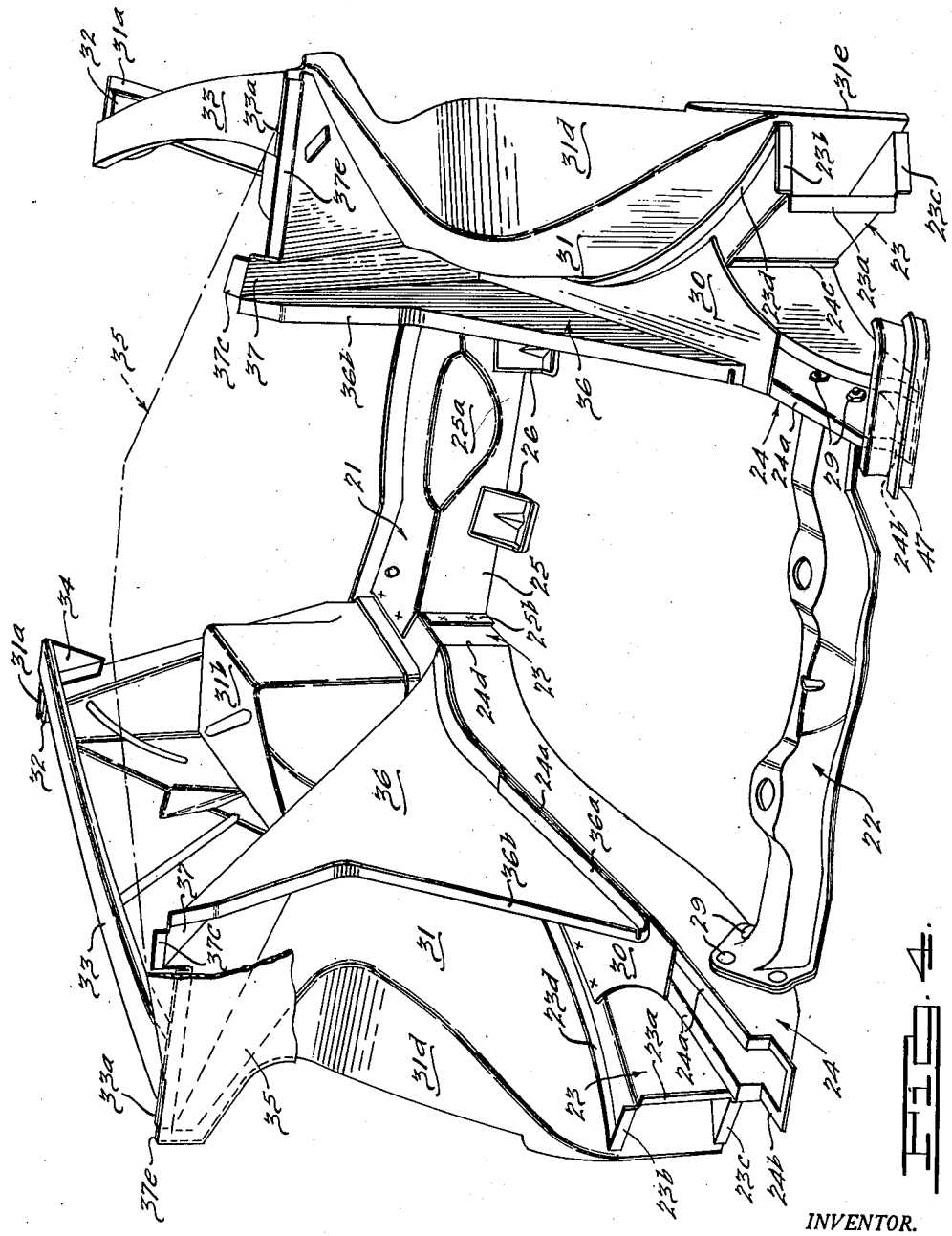

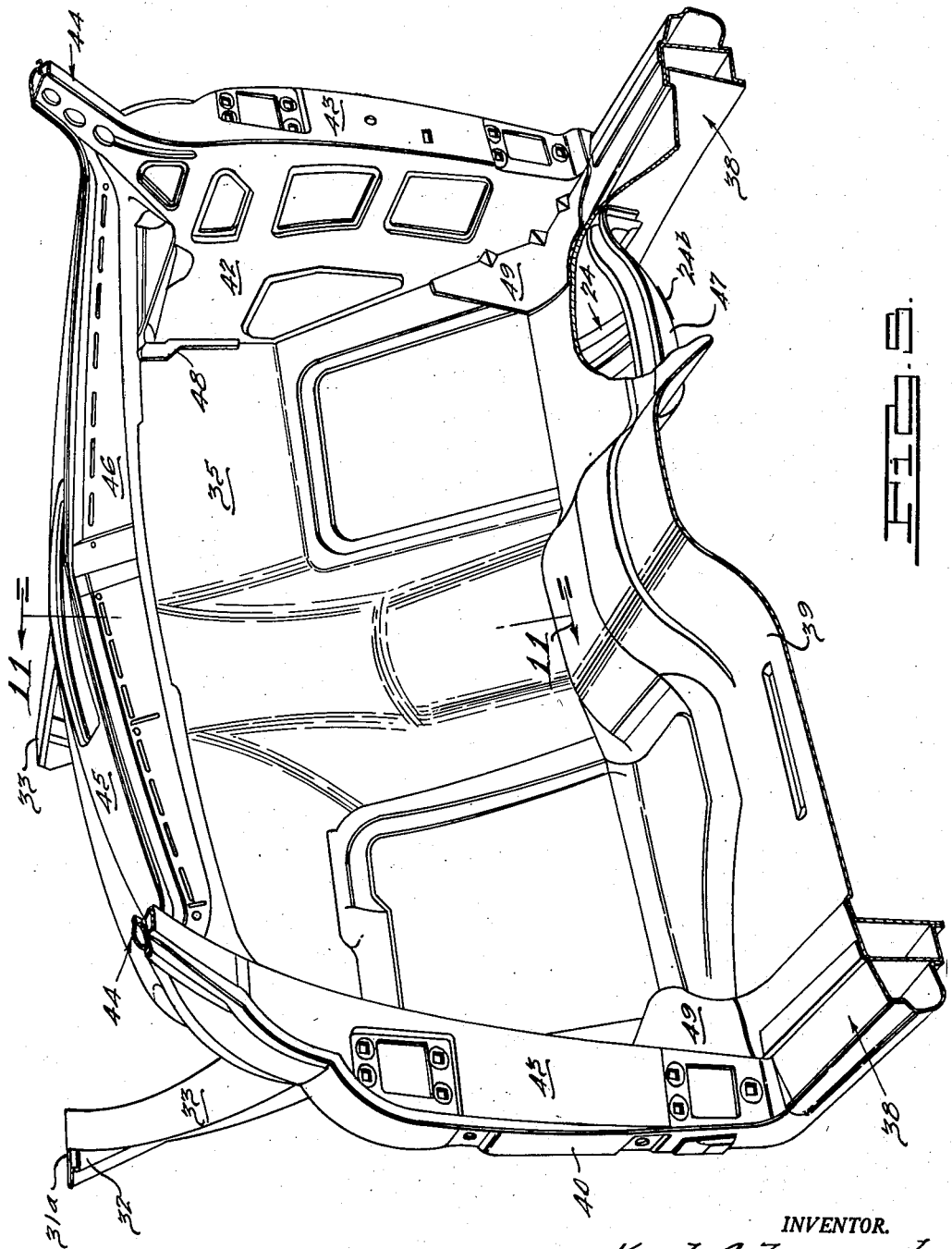

Oct. 6, 1953 K. G. ZUMMACH 2,654,634
AUTOMOBILE BODY FRONT END STRUCTURE
Filed Dec. 8, 1950 6 Sheets-Sheet 5
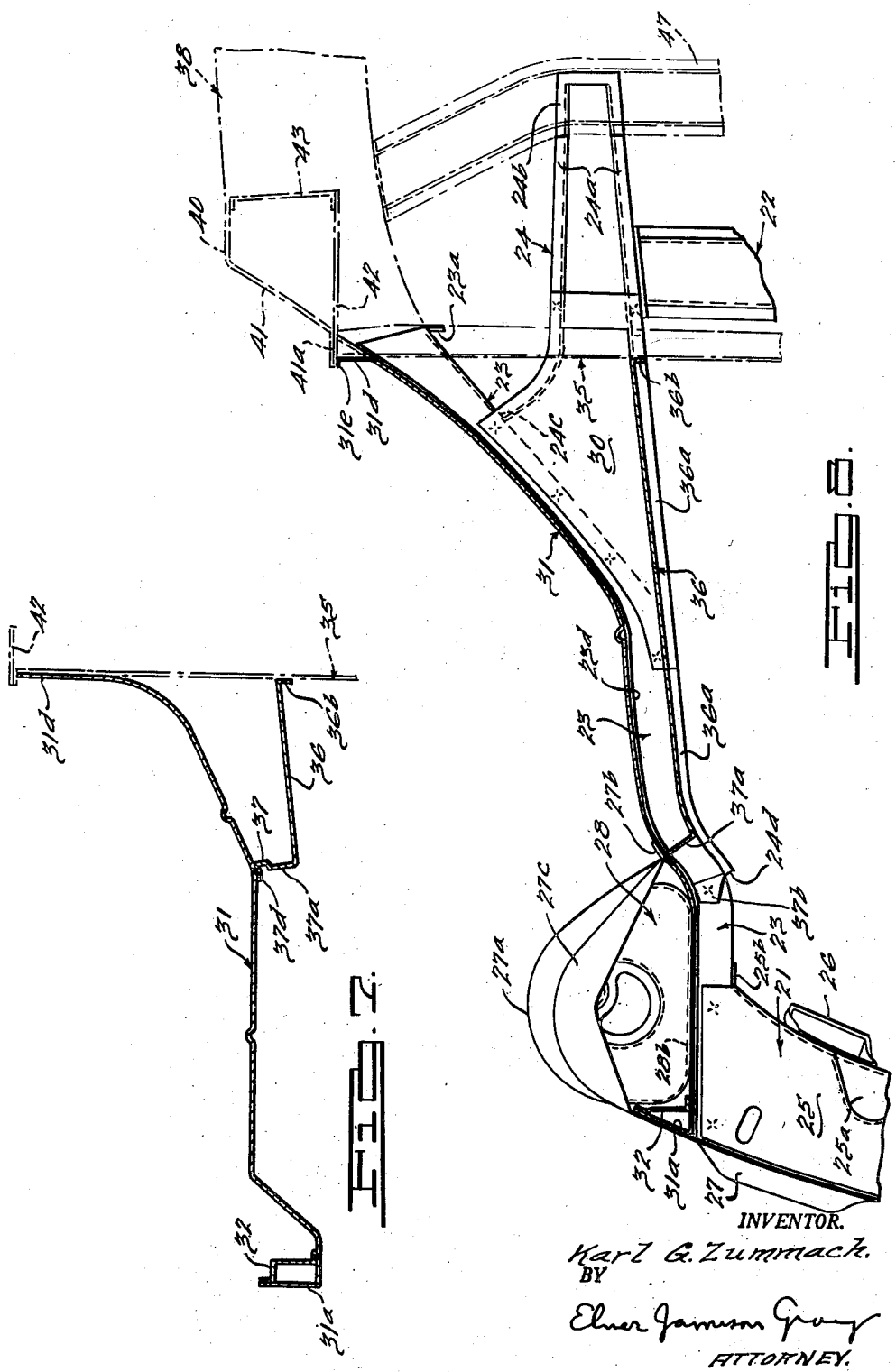
INVENTOR.
Karl G. Zummach.
BY
Elmer Jamison Gong
ATTORNEY.

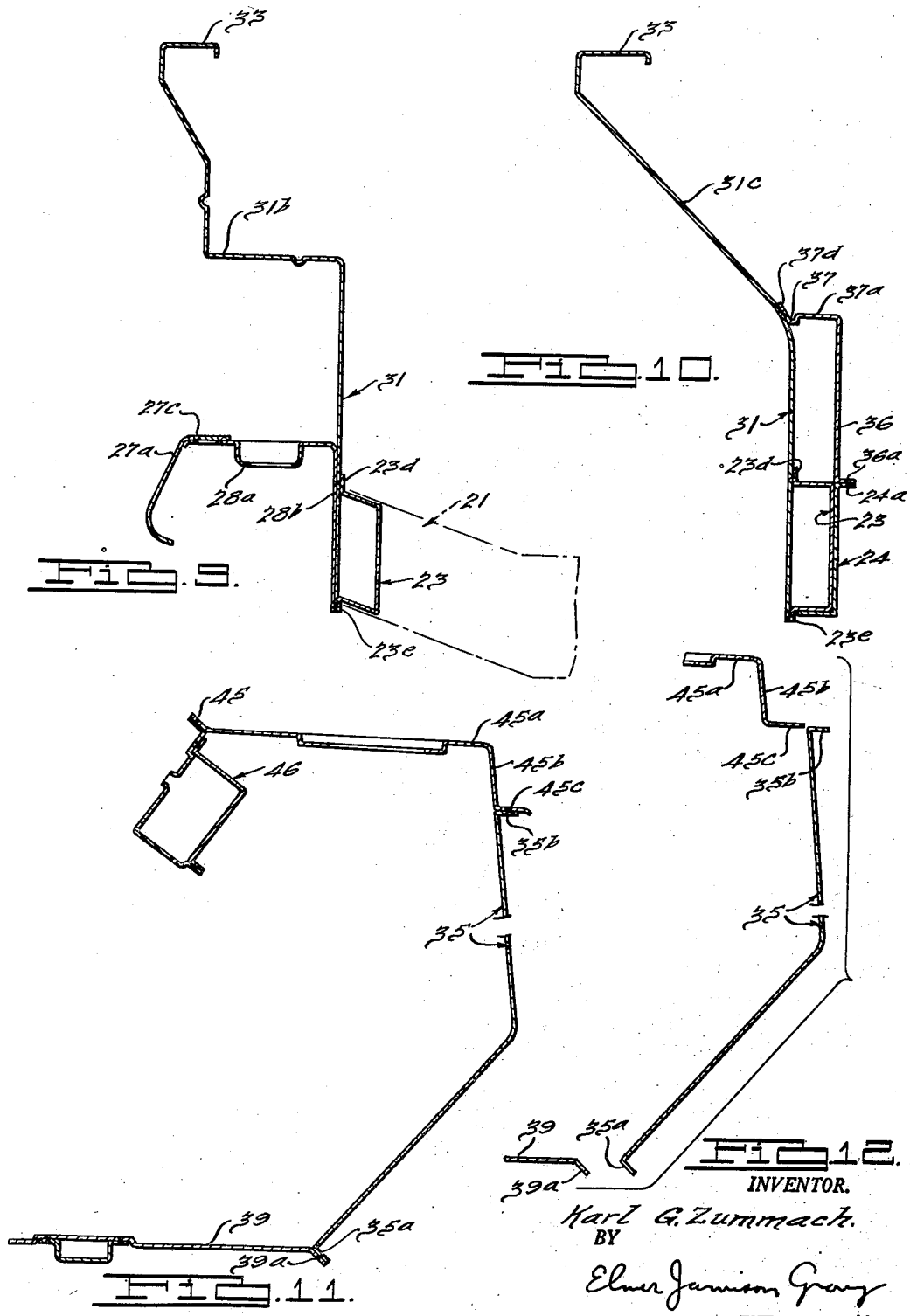

Patented Oct. 6, 1953

2,654,634

UNITED STATES PATENT OFFICE 2,654,634

AUTOMOBILE BODY FRONT END STRUCTURE

Karl G. Zummach, Detroit, Mich., assignor to Briggs Manufacturing Co., Detroit, Mich., a corporation of Michigan Application December 8, 1950, Serial No. 199,789

11 Claims. (Cl. 296—28)

This invention relates to motor vehicles and especially to improvements in the front end construction of the frame and body of automobiles. More particularly the present invention contemplates the provision of a sectional frame and body construction wherein the front end of the vehicle including portions of the main frame and body with which the motor support is incorporated are fabricated as a separate assembly unit capable of being readily united with the main body and frame structure to produce the complete assembled automobile.

An object of the invention is to provide an improved front end construction for a motor vehicle comprising, as a unitary structure, frame members, dash and side body panels united together to form rigid box-like sections at each side of the vehicle front, resulting in the provision of a frontal structure of superior strength capable of reducing frontal deflections and withstanding strains, stresses and shocks to which the front end of the vehicle is subjected during vehicle operation.

Another object is to provide an improved frontal structure and motor support assembly comprising a pair of transversely spaced longitudinal side frame members joined together by a pair of longitudinally spaced cross frame members. Supported on each longitudinal side frame member and extending forward from the dash panel is an outer upright wheelhouse panel and an inner upright brace panel, these panels being spaced apart transversely and the forward edges thereof being connected by means of a transverse upright spacing panel, which may comprise an outturned flange extension of the inner brace panel welded to the outer wheelhouse panel. The rearward edges of the wheelhouse and brace panels are shaped to conform to the dash panel which extends transversely across these edges and is welded thereto to complete a closed box-like structure at each side of the motor support.

Another object is to provide a unitary front end structure of the foregoing character wherein the longitudinal side frame members bifurcate rearwardly to form transversely spaced pairs of inner and outer frame members, the inner frame members being adapted to support a forward body cross frame member welded thereto when the body and front end structure are joined, the outer frame members terminating rearward in portions adapted to be welded to the forward ends of the corresponding body side frame members as forward extensions thereof.

Another object is to provide an improved motor support assembly comprising a forward cross frame member having lateral extensions which loop rearward around and are welded to lateral supports for the front wheel suspension and are also welded to adjacent forward portions of the wheelhouse panels and longitudinal side frame members. By such a construction the front wheel suspension load at each side is carried by a support integral with the forward cross frame and corresponding side frame member and wheelhouse panel. A superior support for the front wheel suspension is thus achieved together with a better and more effective distribution of load.

Other objects of this invention will appear in the following description and appended claims, reference being had to the accompanying drawings forming a part of this specification wherein like reference characters designate corresponding parts in the several views.

Fig. 1 is a perspective view looking rearward from above and to one side of an automobile front end structure embodying the present invention.

Fig. 2 is a vertical section taken substantially in the direction of the arrows along the line 2—2 of Fig. 1.

Fig. 3 is a vertical section taken substantially in the direction of the arrows along the line 3—3 of Fig. 1.

Fig. 4 is a perspective view looking forward from above and one side of the structure illustrated in Fig. 1, the major portion of the dash panel being broken away.

Fig. 5 is a fragmentary perspective view looking forward from above and one side, showing the forward portion of the main vehicle body structure which is adapted to be united to the front end structure of Figs. 1 and 4.

Fig. 6 is a fragmentary perspective view looking forward from above and one side, showing the front end structure and the forward portion of the main body structure prior to assembly thereof.

Fig. 7 is a horizontal section through the wheelhouse panel, taken substantially in the direction of the arrows along the line 7—7 of Fig. 1, a portion of the dash panel and body assembly being shown in phantom.

Fig. 8 is a horizontal section through the lower portion of the wheelhouse panel, taken in the direction of the arrows substantially along the line 8—8 of Fig. 1, portions of the dash panel and body being illustrated in phantom.

Fig. 9 is a vertical transverse section through the forward portion of the wheelhouse panel, taken in the direction of the arrows substantially along the line 9—9 of Fig. 1, a portion of the motor support forward cross frame member being illustrated in phantom.

Fig. 10 is a vertical transverse section through the rearward portion of the wheelhouse panel, looking in the direction of the arrows substantially along the line 10—10 of Fig. 1.

Fig. 11 is a fragmentary vertical longitudinal mid-section through the dash panel, taken in the direction of the arrows substantially along the line 11—11 of Fig. 5.

Fig. 12 is a fragmentary section similar to Fig. 11, showing portions of the body and dash panel prior to being united as an integral unit.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example comprising the front end assembly of Figs. 1 and 4 and the body assembly of Figs. 5 and 6 which are united and welded together at their regions of juncture to complete a rugged, unitary structure. Referring particularly to Figs. 1 and 4, the front end assembly comprises two similar side sub-assemblies spaced by forward and rearward cross frame members which are indicated generally by numerals 21 and 22 respectively. The lower support for each side assembly comprises outer and inner longitudinal frame side members, indicated generally by the numerals 23 and 24 respectively, which preferably comprise forward extensions of the usual body side frame members or sills as discussed below. The side frame members 23 and 24 at each side extend generally side by side at their rearward portions, Fig. 4, and merge forward into a single reinforced side frame element or outward opening channel section, Fig. 10.

Each outer frame extension 23 comprises a laterally opening channel member having a channel base which terminates rearward in an inner bent attachment flange 23a and also having upper and lower channel side portions which terminate rearward in attachment flanges 23b and 23c extending generally vertically upward and downward respectively. As discussed below, the flanges 23a, 23b, 23c are adapted to conform to the corresponding adjacent surface portions of a dash panel and to be securely welded thereto. From the rearward end, each outer side frame extension 23 curves inward and forward around the inside of the front wheel space, Fig. 8, then extends generally forward to the front end of the motor support assembly whereat the two members 23 are joined by the forward cross frame member 21. The longitudinal outer edges of the upper and lower channel side portions likewise terminate in generally vertical oppositely directed flanges 23d and 23e respectively adapted to conform to the inner surface of a wheelhouse panel and to be welded thereto as discussed below.

Referring to Figs. 2 and 3, the front cross member 21 comprises a channel member 25 recessed centrally at 25a to accommodate portions of the motor assembly, not shown, and having a forward opening flanged channel mouth. At each end the channel base of the member 25 is formed with a rearward flange 25b which abuts and is welded to the adjacent side of the outer frame extension 23. The channel sides of the member 25 extend laterally of the flanges 25b closely above and below the adjacent channel side portions of the frame member 23 and are securely welded thereto, Fig. 4. Welded to the base of the channel element 25 are a pair of transversely spaced motor support pads 26, Figs. 3 and 4.

Extending transversely across the front of the front cross member is a closure panel 27, Fig. 1, welded across the flanged channel mouth of the member 25 to complete a box section therewith, Figs. 2 and 3. Each lateral end of the panel 27 extends beyond the corresponding end of the member 25 in a rearward loop 27a, Fig. 8, which extends closely around an apertured platform 28 and terminates in a generally rearward attachment flange 27b. The platform 28 is adapted to carry the load of the front wheel suspension and is provided with a depressed shock absorber retaining seat 28a and a depending inner flange portion 28b, Fig. 9. An upper reinforcing fold 27c of the loop 27a overlaps the outer portion of the platform 28 and is welded securely thereto.

Each inner frame member 24 comprises an upward opening channel at its rearward portion having channel sides terminating in generally horizontal oppositely directed flanges 24a, Fig. 4, and terminates rearward in a downward stepped seat 24b adapted to support a transverse body frame member when the body and motor support assemblies are brought together. Forward of the seat 24b, the rearward cross frame member 22 comprising an inverted channel member is suitably secured to the inner channel sides of the side frame members 24, as for example by bolts 29.

The outer channel side wall of each inner side frame member 24 curves outward forward of the cross frame member 22 and terminates in a generally rearward extending attachment flange 24c welded to the adjacent channel base of the outer frame extension 23, Fig. 4. The channel base and inner channel wall of the frame member 24 extend generally forward and terminate at 24d rearward of the front cross frame member 21, Figs. 4 and 8. Intermediate the ends of each member 24, the aforesaid base and inner channel side thereof meet the bottom channel side wall and channel base respectively of the corresponding side frame member 23 and extend forward therewith in juxtaposed double thickness relation, Fig. 10, being preferably welded thereto. As indicated in Fig. 4, the upper channel wall of the frame extension 23 and the flanges 24a of the frame member 24 lie substantially in the same horizontal plane and are joined by a tie plate 30 welded thereto in position covering the rearward portion of the channel mouth of the inner frame member 24 intermediate the latter's forward end and the cross frame member 22, Fig. 8.

Referring particularly to Figs. 7 through 10, the outer wall of each motor support side assembly comprises a generally upright wheelhousing panel 31 curved longitudinally to conform closely to the outer side frame member 23 and welded at its lower portion to the attachment flanges 23d and 23e. The forward portion of the panel 31 extends adjacent the inner surfaces of the flanges 27b and 28b and terminates forward of the platform 28 in an outward directed upright attachment flange 31a, Figs. 7 and 8, welded near its lower end to the forward inner portion of the panel loop 27a. The flange 31a and forward end of each panel 31 are reinforced by an upright bracket member 32 welded thereto so as to complete at each side of the motor support assembly a forward pillar of generally rectangular cross-section at its upper portion, Fig. 7, and triangular cross section at its lower portion, Fig. 8. It is seen by this construction that each platform 28 which supports the wheel suspension load is integral with the forward cross frame member 21, the adjacent longitudinal side frame member 23 and wheelhouse panel 31, so that the front wheel suspension load is transmitted to the entire unitary motor support assembly.

Rearward of the pillar 31a, 32, Fig. 1, the upper forward portion of the wheelhousing panel 31 is offset outward, providing a battery seat 31b, and the upper rearward portion inclines outward at 31c. A cowl ledge 33 comprising in the present instance an inbent flange of the upper edge of the panel 31 extends longitudinally of the latter, Fig. 1, terminating at its rearward edge in a vertical attachment flange 33a. At its forward end, the ledge 33 is rigidly reinforced by the triangular bracket element 34 welded thereto and to the inner upper wall portion of the motor support pillar 31a, 32. Below the ledge 33, a rearward edge of each panel 31 terminates in an outwardly directed flange 31d generally concave rearward in longitudinal vertical section, as indicated in Fig. 4, so as to conform to the vertical contour of the corresponding lateral portions of the dash panel 35, Fig. 6. The lower portion of each flange 31d terminates laterally in a vertical generally forward directed attachment flange 31e to which is welded an overlapping portion of the body assembly as discussed below.

Reinforcement for the wheelhouse panels 31 and dash panel 35 is provided by a pair of generally upright dash brace panels 36 spaced inward from the wheelhouse panels. The lower edge of each brace panel 36 extends inward as a footing flange 36a which overlies and is welded to the upper inbent flange 24a of the inner sidewall of the corresponding inner frame member 24, the inner edge portions of the corresponding tie plate 30 being interposed between the flanges 24a and 36a and welded thereto to complete an integral triple thickness structure along the rearward portions of the flange 36a, Figs. 1 and 4. At its rearward edge, the brace panel 36 is concave similarly to the flange 31d and is provided with an inbent flange 36b also adapted to conform to the contour of the dash panel 35 and to be welded thereto.

The forward edge of each panel 36 inclines generally rearward and is spaced from the adjacent outer wheelhousing panel 31 by a transverse panel 37 also inclined forward and comprising in the present instance an outward folded integral portion of the panel 36. The inner edge of each panel 37 is reinforced by a forward offset rib 37a, which terminates in a lower attachment flange 37b overlying and welded to the upper channel sidewall of the outer frame extension 23, Figs. 1 and 8, and in an upper attachment flange 37c comprising an integral continuation of the rearward inbent flange 36b. The panel 37 terminates at its outer edge in a generally forward extending flange 37d, which conforms to the inner surface of the wheelhouse panel 31 and is welded thereto, and terminates at its upper edge in a generally transverse attachment flange 37e intermediate and welded to the flange 33a and corresponding upper lateral edge of the dash panel 35, Figs. 1 and 4.

As indicated in Figs. 1, 4 and 6-8, the dash panel 35 extends transversely across the motor support assembly, conforming closely to rearward portions thereof to which it is welded, including the transversely spaced concave wheelhouse flange 31d and brace panel flange 36b at each side of the dash panel, the upper flange 37c and welded together flanges 33a and 37e at the upper lateral portions of the dash panel, and the frame extension flanges 23a, 23b, 23c at its lower lateral portions. The lower central portions of the edge of the dash panel 35 are raised to clear the inner frame extensions 24, Fig. 6, and terminate in a generally forward extending flange 35a, Figs. 1 and 6, the lateral portions of which rest on and are welded to the corresponding plates 30. At its upper edge, the dash panel 35 extends forward in an attachment flange 35b adapted to be welded to an overlapping cowl panel flange when the body and motor support assemblies are united. By this construction, each wheelhouse panel 31 and associated dash brace panel 36, together with the upper spacing panel 37, lower frame extensions 23, 24, and dash panel 35, comprise a closed box-like structure which is particularly effective in resisting torsional strains tending to cause relative movement between the components of the motor support assembly, such as the cowl ledges 33 which cannot be feasibly braced by cross frame members comparable to the lower members 21 and 22.

Also by virtue of this construction, the component parts of the motor support assembly may be readily assembled and welded together as an integral unit independently of the body structure and thereafter feasibly joined by welding to a unitary body assembly. Referring in particular to Figs. 5, 6, 8 and 11, the body assembly in the present instance comprises the longitudinal sills and side frame members of double box section, indicated generally by the numeral 38, spanned by a floor pan 39, Fig. 5, comprising an integral all-welded structure with the side frame members 38 and terminating at its forward edge in an attachment flange 39a adapted to abut and underlie the central portion of the dash panel flange 35a, Figs. 11 and 12. Extending upward as an integral part of the outer portions of each sill and side frame structure 38 is an outer body side panel 40 having a forward and inward extending panel portion 41. The latter is ordinarily concealed by the engine hood, not shown, and terminates in a forward upright flange 41a.

Spaced inwardly from the outer panel 40 is an inner body panel 42 welded at its forward edge to the inner surface of the flange 41a, Figs. 5 and 8, the welded together portions 41a, 42 being also adapted to fit snugly against the wheelhouse flange 31e and to be welded thereto when the body and front end or motor support assemblies are united. The rear edges of the panels 40 and 42 are spaced by and welded to a flanged vertical door jamb panel 43, which panels on each side of the body extend upward to provide the usual integral front pillar construction 44. The upper edges of the outer panels 40 also merge with a transverse cowl panel 45 having a forward and downward stepped portion 45a, Fig. 11, ordinarily concealed by the aforementioned engine hood. At its forward edge the cowl panel portion 45a extends downward at 45b and terminates in a forward extending transverse flange 45c adapted to overlie and to be welded to the upper dash panel flange 35b when the body and front end or motor support assemblies are united, Figs. 11 and 12. Also spacing and welded to the body side structures below the rearward portions of the cowl panel 45 is the usual instrument panel housing 46 which serves as an upper transverse reinforcement.

A lower transverse reinforcement or frame member 47 of channel section extends below the floor pan 49 and is welded to the underside thereof as well as to the longitudinal side frame members 38 at its opposite ends. The cross frame member 47 is located sufficiently rearward of the flange 39a so that when the forward end of the body assembly and rearward portions of the front end or motor support assembly are brought into juxtaposed position for welding together, with the floor panel flange 39a abutting the dash panel lower flange 35a and with the cowl panel flange 45c overlying the upper dash panel flange 35b, the lateral portions of the cross frame member 47 will rest on and be supported by the seat portions 24b of the motor support inner frame members 24.

From the foregoing it will be seen that the body and frame front end structure is fabricated separately of the main body and frame structure, these structures being brought together as indicated in Figs. 5, 6, 11 and 12 and united by welding at their several regions of juncture, including the body cross frame member 47 supported at 24b, to complete a rugged unitary vehicle body construction. Additional reinforcement between the main body and front end assemblies is provided where desired, as for example by tie plate 48 lapping and welded to adjacent portions of the dash and body panels 35 and 42 and similar tie plates 49 lapping and welded to adjacent portions of the panels 35, 39 and 42, Fig. 5.

I claim:
1. In a vehicle body frontal structure, a longitudinal frame side member extending the length of the frontal structure at each side and bifurcating near its rear end to provide inner and outer frame side extensions, each inner extension terminating rearward in a support for a cross frame member, a generally longitudinal wheelhouse panel secured to and extending upward from the outer portion of each frame side member and outer extension, a generally longitudinal dash brace panel spaced inward of each wheelhouse panel and secured to and extending upward from the inner portion of the corresponding frame side member and inner extension, a generally upright dash panel extending transversely across and secured to the rearward ends of the outer frame extensions and the rearward edges of the wheelhouse and dash brace panels, and a spacing panel extending between and secured to the forward edge of each dash brace panel and the adjacent wheelhouse panel to complete a box-like side assembly at each side of the frontal structure.

2. In a vehicle body frontal structure, a longitudinal frame side member extending the length of the frontal structure at each side and bifurcating near its rear end to provide inner and outer frame side extensions, each inner extension terminating rearward in a support for a cross frame member, a generally longitudinal wheelhouse panel secured to and extending upward from the outer portion of each frame side member and outer extension, a generally longitudinal dash brace panel spaced inward of each wheelhouse panel and secured to and extending upward from the inner portion of the corresponding frame side member and inner extension, a generally upright dash panel extending transversely across and secured to the rearward ends of the outer frame extensions and the rearward edges of the wheelhouse and dash brace panels, the forward edge of each dash brace panel declining forward from the dash panel to the corresponding frame side member, and a spacing panel extending between and secured to the forward declined edge of each dash brace panel and the adjacent wheelhouse panel to complete a box-like side assembly at each side of the frontal structure.

3. In a vehicle body frontal structure, a longitudinal frame side member extending the length of the frontal structure at each side and bifurcating near its rear end to provide inner and outer frame side extensions, each inner extension terminating rearward in a support for a cross frame member, a generally longitudinal wheelhouse panel secured to and extending upward from the outer portion of each frame side member and outer extension, a generally longitudinal dash brace panel spaced inward of each wheelhouse panel and secured to and extending upward from the inner portion of the corresponding frame side member and inner extension, a generally upright dash panel extending transversely across and secured to the rearward ends of the outer frame extensions and the rearward edges of the wheelhouse and dash brace panels, a spacing panel extending between and secured to the forward edge of each dash brace panel and the adjacent wheelhouse panel to complete a box-like side assembly at each side of the frontal structure, a forward cross frame member spacing and secured to the longitudinal frame side members near their forward ends, and a rearward cross frame member spacing and secured to the inner frame extensions forward of said supports.

4. In a vehicle body frontal structure, a longitudinal frame side member extending the length of the frontal structure at each side and bifurcating near its rear end to provide inner and outer frame side extensions, each inner extension terminating rearward in a support for a cross frame member, a generally longitudinal wheelhouse panel secured to and extending upward from the outer portion of each frame side member and outer extension, a generally longitudinal dash brace panel spaced inward of each wheelhouse panel and secured to and extending upward from the inner portion of the coresopnding frame side member and inner extension, a generally upright dash panel extending transversely across and secured to the rearward ends of the outer frame extensions and the rearward edges of the wheelhouse and dash brace panels, the forward edge of each dash brace panel declining forward from the dash panel to the corresponding frame side member, a spacing panel extending between and secured to the forward declined edge of each dash brace panel and the adjacent wheelhouse panel to complete a box-like side assembly at each side of the frontal structure, a forward cross frame member spacing and secured to the longitudinal frame side members near their forward ends, and a rearward cross frame member spacing and secured to the inner frame extensions forward of said supports.

5. In a vehicle body frontal structure, a longitudinal frame side member at each side, a generally longitudinal wheelhouse panel secured to and extending upward from the outer portions of each frame side member, a generally longitudinal dash brace panel spaced inward of each wheelhouse panel and secured to and extending upward from the inner portions of the corresponding frame side member, the rearward edges of the dash brace and wheelhouse panels being flanged generally transversely and shaped to conform to a dash panel, a generally upright dash panel extending transversely across and secured to said rearward flanges, the forward edge of each dash brace panel declining forward from the dash panel to the corresponding frame side member, and a spacing panel extending between and secured to the forward declined edge of each dash brace panel and adjacent wheelhouse panel to complete a box-like side assembly at each side of the frontal structure.

6. In a vehicle body frontal structure, a longitudinal frame side member extending the length of the frontal structure at each side and bifurcating near its rear end to provide inner and outer frame side extensions, each inner extension terminating rearward in a support for a cross frame member, a generally longitudinal wheelhouse panel secured to and extending upward from the outer portions of each frame side member and outer extension, a generally longitudinal dash brace panel spaced inward of each wheelhouse panel and secured to and extending upward from the inner portions of the corresponding frame side member and inner extension, the rearward edges of the dash brace and wheelhouse panels being flanged generally transversely and shaped to conform to a dash panel, a generally upright dash panel extending transversely across and secured to the rearward ends of the outer frame extensions and the rearward flanges of the wheelhouse and dash brace panels, the forward edge of the dash brace panel declining forward from the dash panel to the frame side member, a spacing panel at each side extending between and secured to the forward declined edge of the corresponding dash brace panel and adjacent wheelhouse panel to complete a box-like side assembly at each side of the frontal structure, a forward cross frame member spacing and secured to the longitudinal frame side members near their forward ends, and a rearward cross frame member spacing and secured to the inner frame extensions forward of said supports.

7. In a two part vehicle body construction comprising a frontal structure and a rearward structure adapted to be assembled independently of each other and thereafter united, a longitudinal frame side member at each side of the frontal structure and extending the length thereof adjacent the inside of the corresponding wheelhouse space, the rearward portion of each frame side member bifurcating to comprise an inner and an outer frame side extension, the latter terminating rearward in a generally transversely flanged end and curving outward to comprise a forward extension of a corresponding frame side member of the rearward body structure, each inner side frame extension terminating in a support for a cross frame member of the rearward body structure, a forward cross frame member spacing and secured to the frame side members of the frontal structure near their forward ends, a rear cross frame member spacing and secured to the inner side frame extensions forward of said supports, a wheelhouse panel at each side of the frontal structure extending upward from and secured to the outer portions of the corresponding side frame member and outer side frame extension, a dash brace panel at each side spaced inward of the corresponding wheelhouse panel and extending upward from and secured to the inner portions of the corresponding side frame member and inner frame extension, a generally upright dash panel extending transversely across and secured to the flanged end of the outer frame extension and the rearward edges of the wheelhouse and dash brace panels, and a spacing panel at each side extending between and secured to the forward edge of the corresponding dash brace panel and the adjacent wheelhouse panel.

8. In a vehicle body frontal structure, a pair of transversely spaced longitudinal frame side members, a generally upright and longitudinally extending wheelhouse panel secured to the outer portions of each side frame member, a generally upright and longitudinally extending dash brace panel spaced inward from each wheelhouse panel and secured to the inner portions of the corresponding adjacent side frame member, a generally upright dash panel extending transversely across and secured to the rearward edges of the wheelhouse and dash brace panels, a spacing panel extending between the upper edge of each brace panel and adjacent wheelhouse panel to complete a box-like side assembly at each side of the frontal structure, a cross frame member extending transversely across the forward ends of the frame side members and having lateral extensions looped rearward and inward at each side toward the outer surface of the corresponding wheelhouse panel and secured thereto, and a shock absorber support within each looped lateral extension and secured thereto and to the adjacent wheelhouse panel and frame side member.

9. In a vehicle body frontal structure, a pair of transversely spaced longitudinal frame side members, each having an outer rearward extension curving outward and a substantially uncurved inner rearward extension, a wheelhouse panel extending longitudinally of each frame side member and secured thereto, the lower forward portion of each wheelhouse panel extending approximately directly upward from the outer portions of the side frame member and the upper forward portion thereof inclining outward to its upper edge, a generally longitudinal dash brace panel secured to and extending upright from the inner portion of each frame side member and spaced inward of the adjacent wheelhouse panel, a generally upright dash panel extending transversely across and secured to the rearward edges of the wheelhouse and dash brace panels, one edge of each dash brace panel declining forward to the corresponding frame side member, and a transverse forwardly declined spacing panel extending between the declined edge of each brace panel and the adjacent wheelhouse panel.

10. In a vehicle body frontal structure, a pair of transversely spaced longitudinal frame side members, a generally upright and longitudinally extending wheelhouse panel secured to the outer portions of each side frame member, a cross frame member extending transversely across the forward ends of the frame side members and having lateral extensions looped rearward and inward at each side toward the outer surface of the corresponding wheelhouse panel and secured thereto, and a shock absorber support within each looped lateral extension and secured thereto and to the adjacent wheelhouse panel and frame side member.

11. In a two part vehicle body construction comprising a frontal structure and a rearward structure adapted to be assembled independently of each other and thereafter united, a longitudinal frame side member at each side of the frontal structure, the rearward portion of each frame side member bifurcating to comprise an inner and an outer frame side extension, each outer side frame extension curving outward to comprise a forward extension of a corresponding frame side member of the rearward body structure, each inner side frame extension terminating in a support for a cross frame member of the rearward body structure, a forward cross frame member spacing and secured to the frame side members of the frontal structure near their forward ends, and a rear cross frame member of the frontal structure spacing and secured to the inner side frame extensions forward of said supports.

KARL G. ZUMMACH.

References Cited in the file of this patent

UNITED STATES PATENTS

| Number | Name | Date |
|---|---|---|
| 2,113,075 | Breer et al. | Apr. 5, 1938 |
| 2,388,419 | Komenda | Nov. 6, 1945 |

FOREIGN PATENTS

| Number | Country | Date |
|---|---|---|
| 787,258 | France | July 1, 1935 |